INVENTOR.
Paul M. Stivender
BY Paul Fitzpatrick
ATTORNEY

United States Patent Office 3,092,971
Patented June 11, 1963

3,092,971
FLUID CIRCUIT CONTROL FOR TURBINE
POWERPLANT HEATERS
Paul M. Stivender, South Euclid, Ohio, assignor to General Motors Corporation, Detroit, Mich., a corporation of Delaware
Filed Jan. 13, 1958, Ser. No. 708,605
14 Claims. (Cl. 60—59)

My invention relates to turbine power plants and to heater installations for such power plants, and is particularly related to protection of the heater in the event of a break in the system which results in loss of motive fluid.

Closed circuit gas turbine power plants ordinarily employ a gaseous motive fluid under high pressures of the order of 1,000 lbs. per square inch. In such a power plant, a break in a pipe or a turbine or compressor case might result in very rapid loss of the motive fluid. Since the circulation of motive fluid through the heater of the system is relied upon to cool the heater, a loss of motive fluid might have very serious consequences. This is particularly true if the heater is of a nuclear reactor type, since the rate of generation of heat in such a device is very high and cannot be reduced immediately to a negligible level.

My invention is directed principally to means for isolating a broken circuit from the heater and maintaining circulation of motive fluid or cooling fluid from another circuit, either a second power circuit or an auxiliary cooling circuit, through the heater. The principal object of the invention is to improve the safety of closed circuit gas turbine power plants and to minimize the harmful results of any break in the motive fluid system.

The nature of the invention and the advantages thereof will be clearly apparent to those skilled in the art from the following detailed description of preferred embodiments of the invention and the accompanying drawings thereof.

Figure 1:
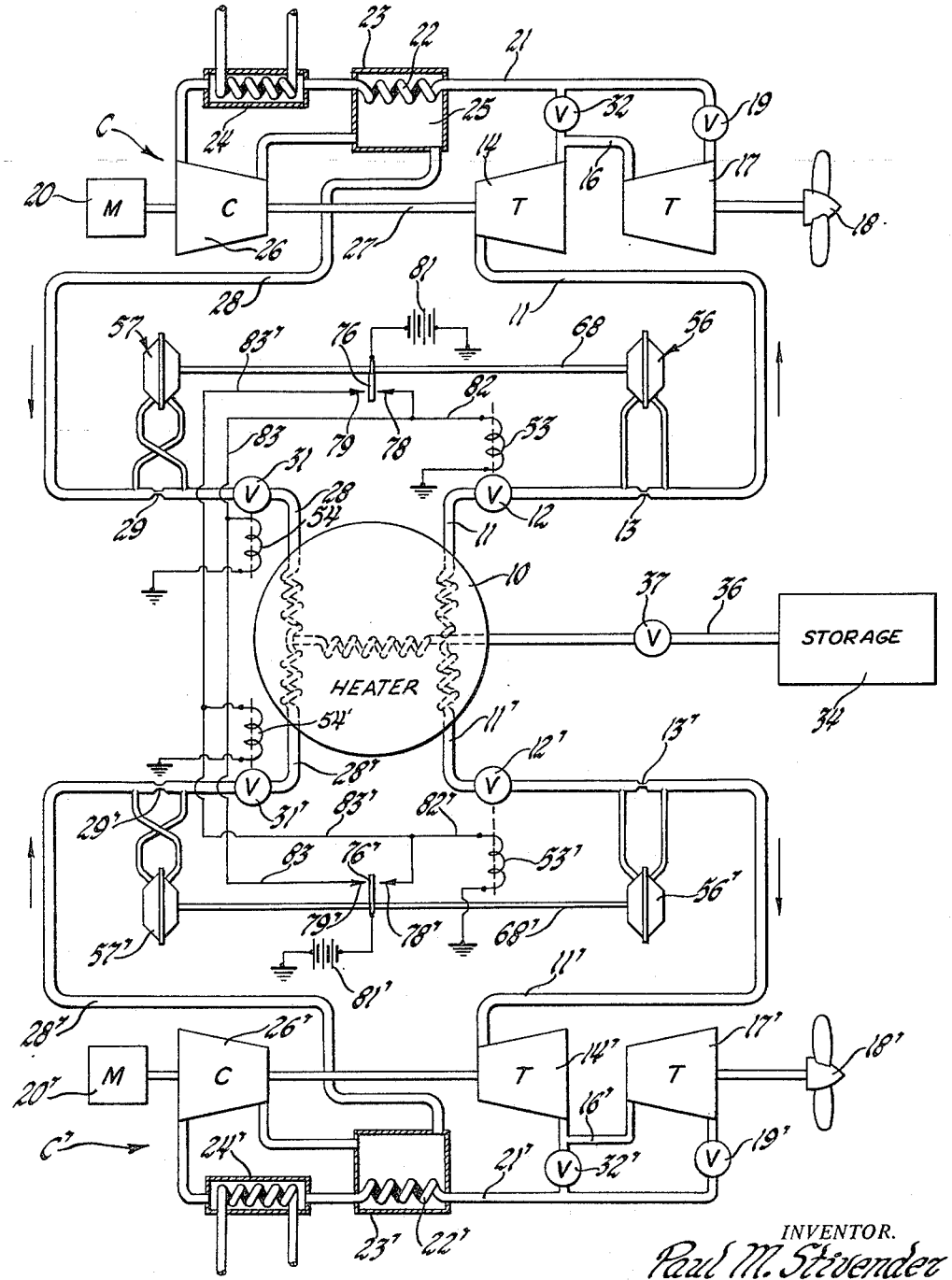
FIGURE 1 is a schematic diagram of a closed circuit gas turbine power plant having two power circuits coupled to a common heater.

Referring first to FIGURE 1, the drawing illustrates a heater 10 which may be of a nuclear reactor type or of any other type suitable for heating motive fluid for a gas turbine system. The heater is connected to two closed circuit gas turbine systems C and C' which are shown as identical.

Circuit C comprises a heater outlet line or conduit 11 having therein a valve 12 and a restriction 13 supplying motive fluid to a compressor-driving turbine 14. The exhaust of turbine 14 is discharged through line 16 to a low pressure turbine 17, which is a power output turbine, and may drive, for example, a ship's propeller 18. The exhaust from turbine 17 flows through a control valve 19, line 21, low pressure pass 22 of a regenerator 23, and through a cooler 24 to the inlet of a compressor 26. Compressor 26 is connected by shaft 27 to turbine 14 and both are connected to a motor 20 which may be used for starting purposes. The compressed fluid discharged from compressor 26 flows through the high pressure pass 25 of regenerator 23 and a heater inlet line 28 to the heater. A restriction 29 and a valve 31 are provided in the heater inlet line. Line 28 is connected to line 11 through the heater, which supplies heat to the motive fluid circulating in circuit C. A valve 32 bypassing the low pressure turbine 17 provides for further control of the power plant. It will be understood that various auxiliary and control devices, common to such systems but immaterial to an understanding of this invention, have been omitted in the interest of conciseness.

The second power circuit C' is identical to the power circuit C and corresponding parts are indicated by corresponding reference numerals with primes. The motive fluid from the two power circuits mingles in the heater, so that a break in either power circuit could cause loss of all motive fluid from both circuits unless some protection against such loss were provided. If the motive fluid is lost, the system can no longer withdraw the energy generated by the heater.

The system also includes a storage reservoir 34 for the motive fluid gas which may, for example, be helium, containing the gas under pressure. Reservoir 34 is connected by conduit 36 and a normally closed valve 37 to the motive fluid circuits through the heater.

The mass flow of gas into the heater through line 28 in normal operation will equal the mass flow from the heater through line 11. Transient conditions may cause some slight variation from this equality of flow. In other words, the flow of gas through lines 28 and 11 should be substantially equal at all times. However, if a motive fluid line, such as 11 or 28, or a compressor or turbine case should rupture, the motive fluid under pressure will rapidly flow from the system. In this case, the balance of flow through lines 11 and 28 will be greatly affected. Ordinarily the flow through line 11 will be much greater than that through line 28, and the flow through line 28 might reverse.

According to this invention, unbalance of flow is detected and, if it occurs, the circuit in which it occurs is quickly isolated from the heater. The preferred means for accomplishing this result is shown generally in FIGURE 1, but more fully in FIGURE 2.

Figure 2:
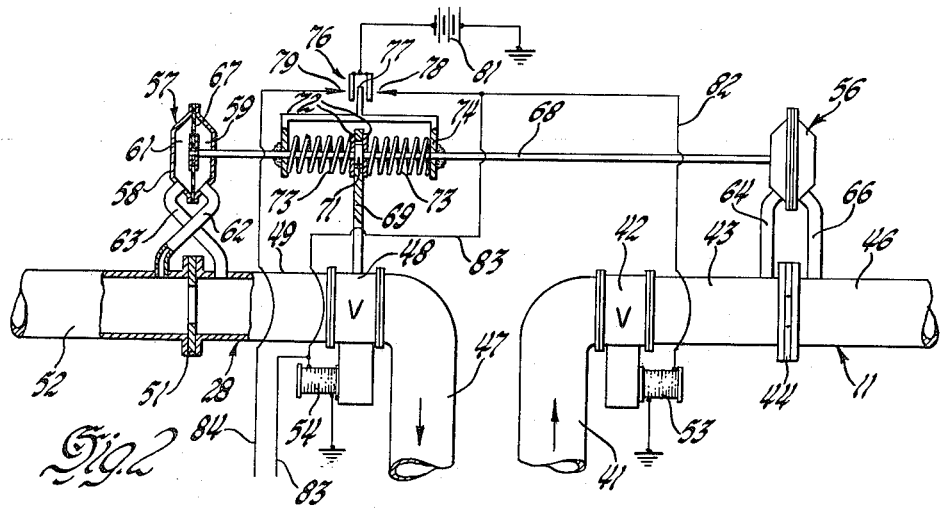
FIGURE 2 is a more detailed schematic drawing of a portion of FIGURE 1.

Referring to FIGURE 2, the heater outlet line 11 comprises a pipe section 41 leading from the heater, a valve 42, a short pipe section 43, an orifice plate 44, and a further pipe section 46 leading to the turbine 14. Inlet line 28 similarly comprises a pipe section 47, a valve 48, a short pipe section 49, an orifice plate 51, and a conduit 52 leading from the regenerator. The valves 42 and 48 are of a normally open quick-closing type which may be closed by stored energy, as by air or gas under pressure. The valves 42 and 48 may be latched open and released by solenoids, 53 and 54 respectively, to allow the stored energy to close the valve. The orifice plates 44 and 51, with pressure-responsive diaphragm devices 56 and 57 of the expansible-chamber motor type, provide means for sensing a loss of flow balance. The valves and orifice plates should be located very close to the heater.

Motor 57 comprises a housing 58 defining chambers 59 and 61 connected respectively through lines 62 and 63 to inlet conduit 28 on opposite sides of orifice plate 51. Motor 56 is similar and is connected through lines 64 and 66 to opposite sides of orifice plate 44. Each of the pressure-responsive devices 56 and 57 includes a diaphragm 67 which responds to the difference of pressure in the two chambers. The two diaphragms are connected by a tension rod 68. It will be noted that both diaphragm devices are connected so that the higher pressure is applied to the inner face so that both pull against the rod 68. The sizes of the orifices and of the diaphragms are such that when mass flow through the lines 11 and 28 is in balance the pull of the diaphragms on rod 68 is balanced.

Means are provided for impositive centering of rod 68 so that it will not move in response to minor unbalances of flow. As illustrated, this comprises a fixed abutment 69 extending from valve 48 and having an opening within which normally is centered an enlargement 71 on rod 68. Washers 72 slidable on rod 68 are mounted at each side of abutment 69. These washers cannot move past the abutment or the enlargement 71. Compression springs 73 are mounted between the washers and a yoke 74 fixed on rod 68. Springs 73 are adjusted to a predetermined desired degree of compression. Rod 68 can move in either direction only by compressing both springs. If it does move, it indicates a serious unbalance of flow presumably due to a break in the system. If flow outlet conduit 11 exceeds that in inlet conduit 28, rod 68 will move to the right. If the unbalance is in the other direction, rod 68 will move to the left.

Yoke 74 is the operator for a switch mechanism 76 shown generally on FIGURE 1 and more particularly on FIGURE 2. The yoke includes a finger 77 which moves in one direction to close a switch 78, and moves in the other direction to close a switch 79. These switches are energized from a suitable current source indicated as a battery 81. If switch 78 is closed due to excess of flow in conduit 11 over conduit 28, it energizes solenoid 53 through a lead 82 and solenoid 54 through a lead 83. If switch 76 closes on contact 79 because of greater flow in conduit 28 than in conduit 11, it energizes valve closing solenoids 54' and 53' of the other circuit through leads 83' and 82'. Lead 83 also is connected to contact 79' of switch 76' in circuit C' which is energized by a battery 81'. Lead 83' is also connected to contact 78' of switch 76'. Each switch thus closes the valves in its own circuit in response to unbalance of flow in one direction, and those of the other circuit in response to unbalance in the other direction.

The connection of the switch of each circuit to the valves of the other circuit is not essential, but it is an additional precaution. A break in circuit C will operate solenoids 53 and 54, as previously described. A break in circuit C' would cause a leakage from circuit C through the heater into circuit C'. The result of this would be greater flow in conduit 28 than in conduit 11. This would operate a pull rod 68 to the left to close switch 79 and energize solenoids 53' and 54' to cut off circuit C' from the heater, if this has not already been effected by switch 76'.

With a failed circuit isolated from the heater, the remaining circuit continuing in operation can remove a considerable quantity of heat from the heater and, of course, the heater energy output would be reduced as rapidly as possible under such conditions. The valve 37 may be opened either manually, or automatically in response to closing of the valves to cut off one circuit, to supply additional gas to the remaining circuit to increase its cooling ability.

Figure 3:
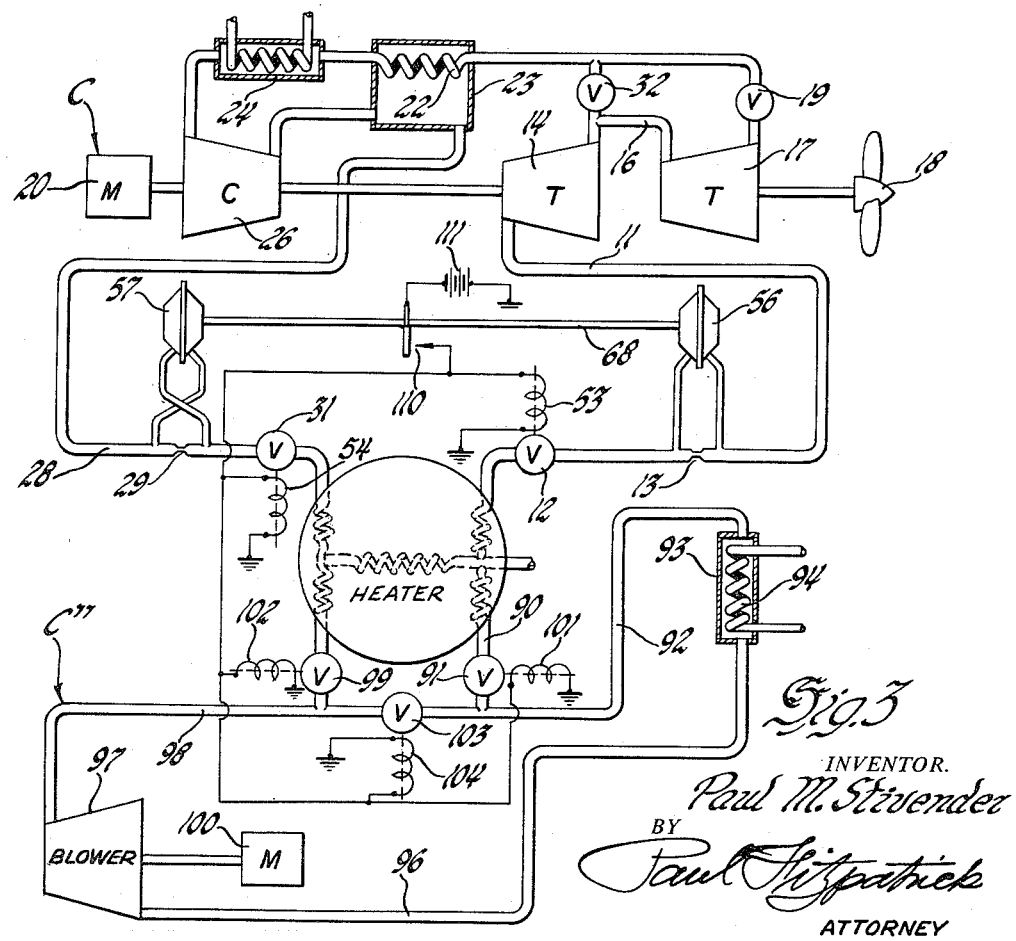
FIGURE 3 is a schematic diagram of a power plant with a single power circuit, a heater, and an auxiliary cooling circuit for the heater.

The system illustrated schematically in FIGURE 3 comprises a closed gas turbine power circuit C which may be identical to either of those in FIGURE 1 except that it does not communicate with another power circuit through the heater. For this reason, the elements of the circuit are identified by the same numerals as in FIGURE 1 and will not require detailed description.

In the system of FIGURE 3, an auxiliary cooling circuit is provided for the heater. This cooling circuit might be employed for heater cooling upon normal shut-down of the power circuit. The invention provides means by which the power circuit may be cut off from the heater in the event of casualty to it, and, in this event, the cooling circuit is connected to circulate cooling fluid through the heater. Both circuits may be connected to the same heating chamber or coils in the heater.

The cooling circuit C" comprises a heater outlet conduit 90 connected through a normally closed valve 91 and line 92 to a cooler 93 cooled by water or other coolant circulated through the coil 94. The cooled gas flows through pipe 96, a circulating blower 97, and a heater supply line 98 to the heater. A normally closed valve 99 is provided in line 98. The normally closed valves 91 and 99 are of a quick-opening type rapidly opened by stored energy when released by solenoids 101 and 102, respectively. The lines 92 and 98 are connected by a normally open bypass valve 103 of a quick-closing type released to close by a solenoid 104. In the normal operation of the power plant, valves 12, 31, and 103 are open and valves 91 and 99 are closed. The energy from the heater is all supplied to the power circuit C. The blower 97 is driven continuously by the motor or engine 100, circulating the cooling fluid idly through the blower bypass valve 103 and cooler 93.

In the event of a casualty to the power circuit, flow through restriction 13 overbalances that through restriction 29. Rod 68 moves to the right, closing switch 110. Switch 110 closes a circuit from a battery 111 to all five of the valve releasing solenoids, cutting off the power circuit from the heater, opening the cooling circuit to the heater, and closing the bypass for the heater in the cooling circuit.

It will be seen that the auxiliary cooling circuit performs the same cooling function that the circuit C' would perform in FIGURE 1 if circuit C were disabled. The cooling circuit, however, must be normally disconnected from the heater, since otherwise it would merely waste energy.

The orifice plate meters perform the same function as venturi type flow meters, which would reduce the pressure loss and thus improve efficiency. The orifice plates have one advantage, however, in that they would provide considerable resistance to greatly increased flow such as might result from a large break in the system.

It will be apparent to those skilled in the art that either of the systems described is particularly adapted to prompt response to give the heater protection against overtemperature in the event of a break in the power circuit.

The detailed description of preferred embodiments of the invention for the purpose of explaining the principles thereof is not to be construed as limiting the invention, as many modifications may be made by the exercise of skill in the art within the principles of the invention.

I claim:

1. A closed circuit gas turbine power plant, comprising, in combination, a heater, two gaseous motive fluid circuits connected to the heater, each circuit including motive fluid circulating means, motive fluid cooling means, heater inlet and outlet lines, and valves in the said lines; and means responsive to a break in one of the circuits for closing both said valves in said circuit to isolate that circuit from the heater.

2. A power plant as recited in claim 1 in which both circuits include power output turbines.

3. A power plant as recited in claim 1 in which said one circuit includes a power output turbine and the other circuit is an auxiliary cooling circuit.

4. A power plant as recited in claim 3 in which the responsive means responds to a break in the power output turbine circuit, and including means actuated by the responsive means for activating the auxiliary cooling circuit.

5. A closed circuit gas turbine power plant comprising, in combination, a heater, two gaseous motive fluid circuits comprising a power circuit including a turbine and a cooling means connected to the heater, and auxiliary cooling circuit including a running blower and a cooler connectable to the heater, heater inlet and outlet lines in each of said circuits and valves in said lines, means in the power circuit responsive to a break in the power circuit effective to close both said valves in said circuit to isolate the power circuit from the heater, and means actuated simultaneously by the responsive means effective to connect the auxiliary cooling circuit to the heater.

6. A closed circuit gas turbine power plant comprising, in combination, a heater, two gaseous motive fluid circuits comprising a power circuit including a turbine and a cooling means connected to the heater, an auxiliary cooling circuit including a running blower and a cooler connectable to the heater, heater inlet and outlet lines in each of said circuits and valves in said lines, means in the power circuit responsive to unbalance of flow into and from the heater effective to close both said valves in said power circuit to isolate the power circuit from the heater, and means actuated simultaneously by the responsive means effective to connect the auxiliary cooling circuit to the heater.

7. A closed circuit gas turbine power plant comprising, in combination, first and second interconnected motive fluid circuits, each containing fluid circulating means and a cooler in series, a heater having inlet and outlet lines, the heater being common to and interconnecting the circuits, and means for isolating the first circuit from the heater in the event of loss of integrity thereof comprising valves in the first circuit in the heater inlet and outlet lines, the valves being of a normally open quick-closing type releasable to close and having releasing means therefor, means sensitive to a discrepancy in the mass flow in the heater inlet and outlet lines of the first circuit, and means actuated by the sensitive means connected to the releasing means of the valves.

8. A closed circuit gas turbine power plant comprising, in combination, two interconnected motive fluid circuits, each containing a compressor, a heater inlet line, a heater, a heater outlet line, a turbine, and a cooler in series, the heater being common to and interconnecting the circuits, and means for isolating one circuit from the heater in the event of loss of integrity thereof comprising valves in each circuit in the heater inlet and outlet lines, the valves being of a normally open quick-closing type releasable to close and having releasing means therefor, means including orifice plates in each heater inlet line and each heater outlet line and pressure-responsive means responsive to the pressure drop through each orifice responsive to flow in the inlet and outlet lines, means connecting the pressure responsive means of each circuit in opposition sensitive to a discrepancy in the mass flow in the heater inlet and outlet lines of that circuit, and means actuated by the sensitive means of each circuit connected to the releasing means of the valves of that circuit.

9. A closed circuit gas turbine power plant comprising, in combination, two interconnected motive fluid circuits, each containing a compressor, a heater inlet line, a heater, a heater outlet line, a turbine, and a cooler in series, the heater being common to and interconnecting the circuits, and means for isolating one circuit from the heater in the event of loss of integrity thereof comprising valves in each circuit in the heater inlet and outlet lines, the valves being of a normally open quick-closing type releasable to close and having releasing means therefor, means including orifice plates in each heater inlet line and each heater outlet line and pressure-responsive means responsive to the pressure drop through each orifice responsive to flow in the inlet and outlet lines, means connecting the pressure-responsive means of each circuit in opposition sensitive to the magnitude and direction of a discrepancy in the mass flow in the heater inlet and outlet lines of the circuit, and means actuated by the sensitive means of each circuit connected to the releasing means of the valves of both circuits effective to release the valves of one circuit in response to discrepancy in one direction and the valves of the other circuit in response to discrepancy in the other direction.

10. A closed circuit gas turbine power plant comprising, in combination, a motive fluid circuit containing a compressor, heater inlet line, a heater, a heater outlet line, a turbine, and a cooler in series; a cooling fluid circuit containing a blower, a heater supply line, the heater, a heater discharge line, and a cooler in series; means for isolating the motive fluid circuit from the heater in the event of loss of integrity thereof comprising valves in the heater inlet and outlet lines, the valves being of a normally open quick-closing type releasable to close and having releasing means therefor, means sensitive to a discrepancy in the mass flow in the inlet and outlet lines, means actuated by the sensitive means connected to the releasing means of the said valves; and means actuated simultaneously by the sensitive means for effectively coupling the cooling circuit to the heater.

11. A closed circuit gas turbine power plant comprising, in combination, a motive fluid circuit containing a compressor, a heater inlet line, a heater, a heater outlet line, a turbine, and a cooler in series; a cooling fluid circuit containing a blower, a heater supply line, the heater, a heater discharge line, and a cooler in series; means for isolating the motive fluid circuit from the heater in the event of loss of integrity thereof comprising valves in the heater inlet and outlet lines, the valves being of a normally open quick-closing type releasable to close and having releasing means therefor, means sensitive to a discrepancy in the mass flow in the inlet and outlet lines, means actuated by the sensitive means connected to the releasing means of the said valves; means for effectively coupling the cooling circuit to the heater comprising normally closed quick-opening valves in the heater supply and discharge lines of a type releasable to open and having releasing means therefor, a normally open quick-closing valve of a type releasable to close and having releasing means therefor, said valve connected to bypass the heater and the said quick-opening valves in the cooling fluid circuit, and means actuated by the sensitive means for releasing the three last-mentioned valves.

12. A closed circuit gas turbine power plant comprising, in combination, two power circuits each including a gas turbine, a heater common to the two circuits, heater inlet and outlet lines, and valves in the said lines; and means in each circuit responsive to a break in one of the circuits effective to operate both said valves in that one circuit to isolate that one circuit from the heater.

13. A closed circuit gas turbine power plant comprising, in combination, two power circuits each including a gas turbine, a heater common to the two circuits, heater inlet and outlet lines, and valves in the said lines; means in each circuit effective to operate both said valves in one of said circuits to isolate that circuit from the heater, and means in each circuit responsive to an excess of outflow from the heater over inflow to the heater connected to operate the isolating means of that circuit.

14. A closed circuit gas turbine power plant comprising, in combination, two power circuits each including a gas turbine, a heater common to the two circuits, heater inlet and outlet lines, and valves in the said lines; means in each circuit effective to operate both said valves in one of said circuits to isolate that circuit from the heater, means in each circuit responsive to an excess of outflow from the heater over inflow to the heater connected to operate the isolating means of that circuit, and means in each circuit responsive to an excess of inflow to the heater over outflow from the heater connected to operate the isolating means of the other circuit.

References Cited in the file of this patent

UNITED STATES PATENTS

| 2,453,928 | Oechslin | Nov. 16, 1948 |
| 2,463,964 | Graf | Mar. 8, 1949 |
| 2,751,751 | Strayer | June 26, 1956 |

FOREIGN PATENTS

| 663,112 | Great Britain | Dec. 19, 1951 |
| 776,269 | Great Britain | June 5, 1957 |